United States Patent [19]

Lewis

[11] 4,420,394

[45] Dec. 13, 1983

[54] SOLID GRANULAR CHLORINE DISPENSER FOR SWIMMING POOLS

[76] Inventor: Kenneth Lewis, 11201 S. Garfield, South Gate, Calif. 90280

[21] Appl. No.: 318,954

[22] Filed: Nov. 6, 1981

Related U.S. Application Data

[63] Continuation-in-part of Ser. No. 205,589, Nov. 10, 1980, abandoned.

[51] Int. Cl.³ ............................................. E04H 3/20
[52] U.S. Cl. ................................... 210/169; 422/263; 422/266; 137/268; 210/418; 210/101
[58] Field of Search .............. 210/169, 205, 206, 123, 210/238, 104, 101, 418; 422/37, 263, 264, 266

[56] References Cited

U.S. PATENT DOCUMENTS

| | | | |
|---|---|---|---|
| 3,048,274 | 8/1962 | Lundeen | 210/101 |
| 3,612,080 | 10/1971 | Schneider, Jr. | 422/263 |
| 4,199,001 | 4/1980 | Kratz | 422/264 |

*Primary Examiner*—Peter A. Hruskoci
*Assistant Examiner*—Sharon T. Cohen
*Attorney, Agent, or Firm*—Christie, Parker & Hale

[57] ABSTRACT

There is described a pool chlorinator which uses granular chlorine. The chlorinator has a sealed chamber having a container for the granular chlorine. The container has a vertically moving sleeve forming the side wall and a fixed platform forming the bottom. Water from th pressure side of the pool pump flows across the top of the platform to dissolve the chlorine granules and form a bridge of caked chlorine material in the sleeve above the water. The sleeve is lowered incrementally each time the pump is turned on to move the caked material into dissolving contact with the flowing water.

24 Claims, 7 Drawing Figures

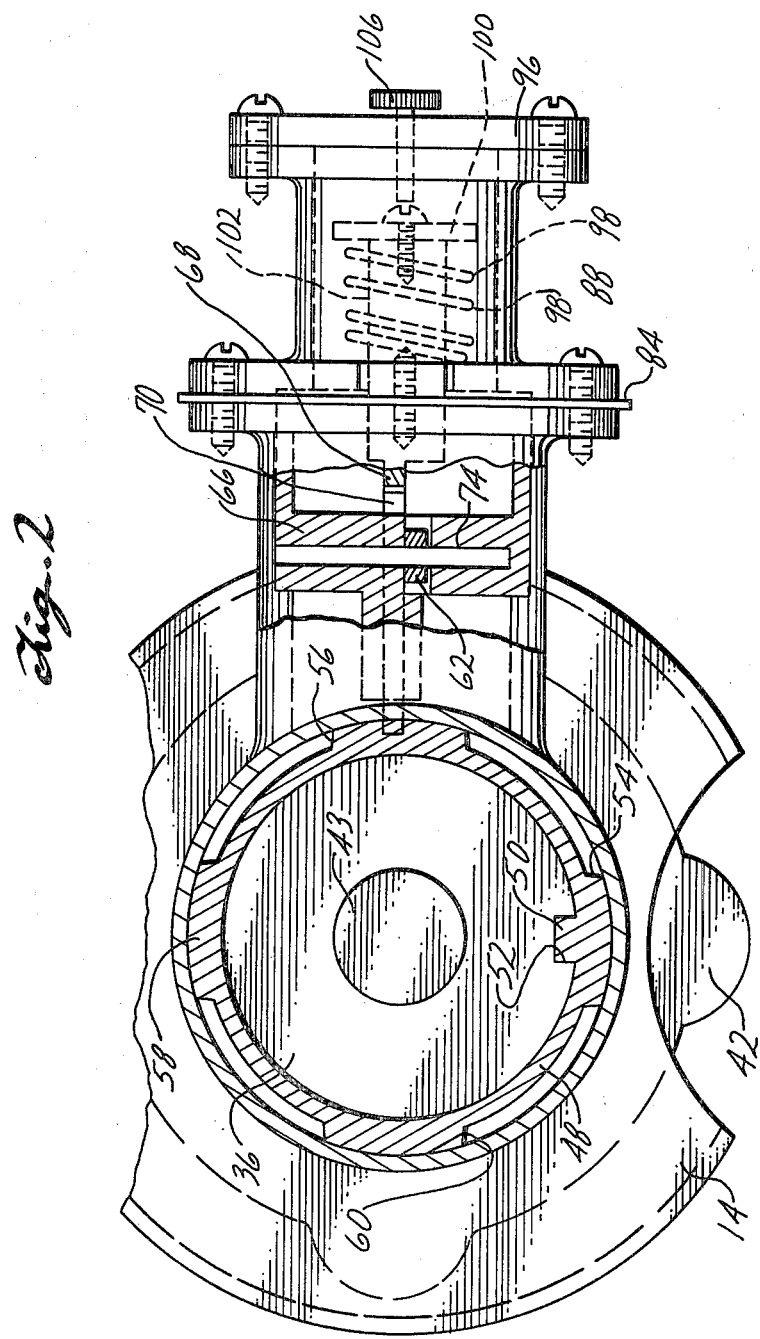

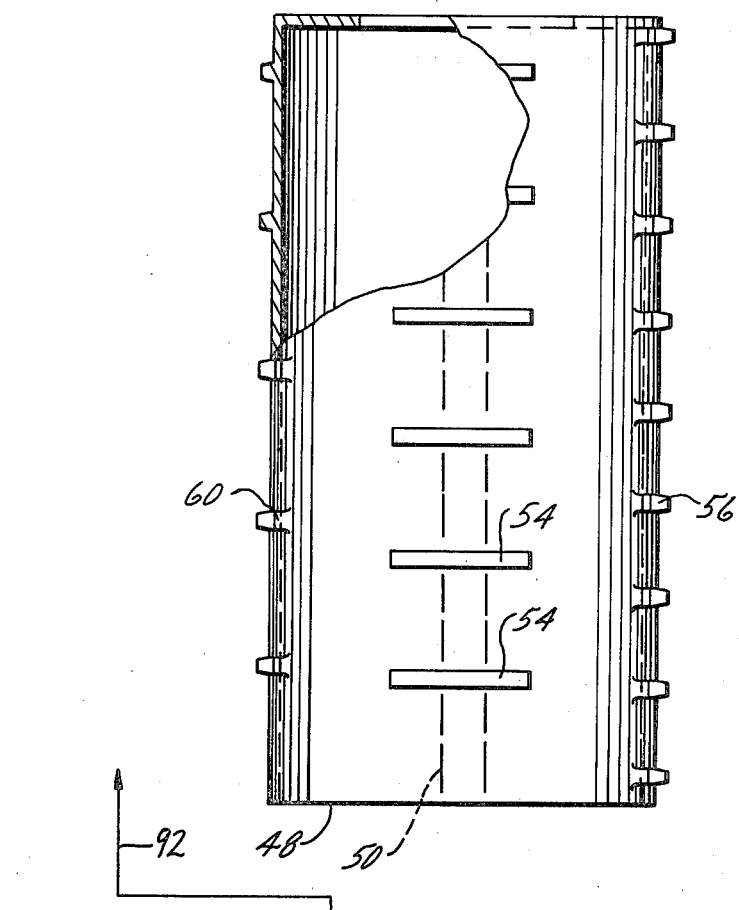
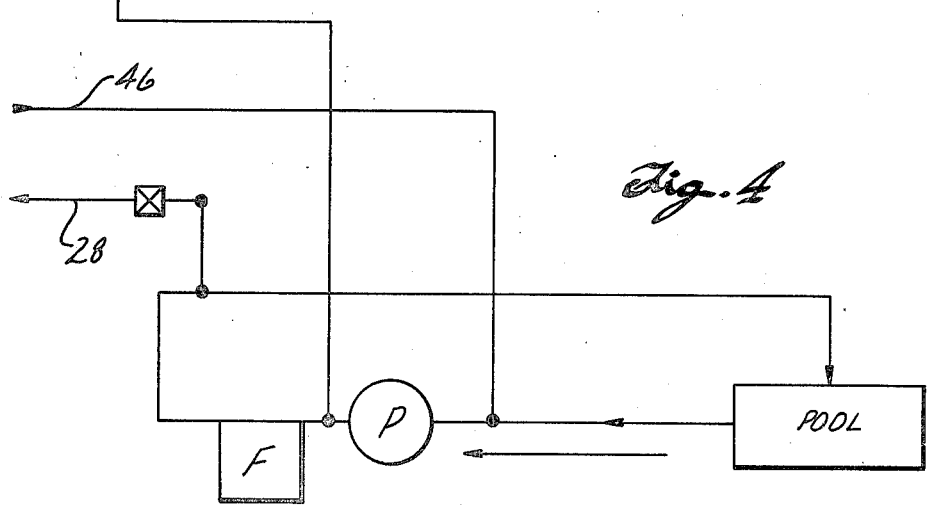

SOLID GRANULAR CHLORINE DISPENSER FOR SWIMMING POOLS

RELATED APPLICATIONS

This application is a continuation-in-part of application Ser. No. 205,589 filed Nov. 10, 1980, now abandoned.

FIELD OF THE INVENTION

This invention relates to pool chlorinators or the like, and more particularly, is concerned with an automatic chlorinator using chlorine in granular form.

BACKGROUND OF THE INVENTION

The use of chlorine in swimming pools to control the growth of algae and to purify the pool water is well-known. Because chlorine gas is very toxic and hazardous to store, chlorine has been added to pools in various chemical forms. Concentrated solutions of chlorine dissolved in water or other liquid has been the most common form of adding chlorine to a pool. The liquid chlorine is heavy to transport and store, and has very limited shelf life. Chlorine is also sold in the form of granular material which can be added to the pool water and is highly soluble. Chlorine is also available in cake or tablet form which is designed to dissolve at a controlled rate to release chlorine into the pool water over an extended period of time.

Automatic chlorinators using the cake form of chlorine have been used which flow water over the chlorine cake at a controlled rate while the pool pump is running. The dissolved chlorine is then mixed with the pool water. Adding chlorine in this manner has a number of disadvantages, the cake form is relatively expensive, it is strongly on the acid side, and the rate of adding the chlorine is difficult to control. The granular form of chlorine is preferable in that it is less expensive, its acid-alkalinity balance is neutral, and it is easy to store. However, the granular form of chlorine has not been utilized satisfactorily for automatic chlorinating systems. One such system is described in U.S. Pat. No. 3,626,972. In the arrangement shown in the patent, the granular material is stored in a supply bin from which it is released by gravity to introduce a measured volume of granules into a measured volume of water each time the pump cycles. One of the problems with granular dispensers of the type disclosed in the prior art is that the granular chlorine in the presence of moisture insufficient to dissolve the granules tends to swell and harden into a crusty form which does not then feed out of the storage container properly. Moreover, the granular chlorine is mixed in a region open to atmosphere, allowing chlorine gas to escape with its corrosive and toxic consequences.

SUMMARY OF THE INVENTION

The present invention is directed to an improved automatic chlorinator utilizing the granular form of chlorine. The chlorinator of the present invention has the advantage that the granular chlorine is stored and mixed with the pool water in a completely sealed chamber. The chlorinator can be easily adjusted and set to control the amount of chlorine which is dispensed with each operating cycle. The amount of chlorine dispensed and dissolved into the pool is independent of the length of time the pump operates during each filtering cycle. In addition to the above advantages, the chlorinator of the present invention is simple, rugged and foolproof in its construction. It can be easily installed in an existing pool filtering system and operates completely automatically.

These and other advantages of the present invention are achieved by providing a chlorinator comprising a housing having a vertical cylindrical chamber in which a tubular sleeve is positioned, the chamber being longer than the sleeve to permit vertical movement of the sleeve in the chamber. A platform member is supported inside the sleeve in fixed relation to the housing, the platform and sleeve combining to form the bottom and sides of a container in which the granulated chlorine is stored. An inlet pipe connects water from the output side of the pool filter into the chamber and directs the water across the top of the platform to dissolve the chlorine granules in the bottom of the container. The water also tends to rise upwardly, causing the granules immediately above the dissolved granules to cake together and expand, forming a bridge in the container immediately above the water. The sleeve is lowered an incremental amount with each operating cycle of the filtering system, lowering the bridge into contact with the water so that additional chlorine may be dissolved with each filtering cycle. In an alternative embodiment, the platform is adjusted upwardly in the chamber so that the water level is raised by an incremental amount with each operating cycle of the filtering system.

BRIEF DESCRIPTION OF THE DRAWINGS

For a more complete understanding of the invention, reference should be made to the accompanying drawings, wherein:

FIG. 2 is a sectional view taken substantially on the line 2—2 of FIG. 1;

FIG. 3 is a detail view of the sleeve partly in section;

FIG. 4 is a schematic flow diagram showing how the chlorinator is connected into the pool filtering system;

FIG. 5 is an elevational view partly in section of an alternative embodiment of the present invention;

FIG. 6 is a sectional view taken substantially on the line 6—6 of FIG. 5; and

FIG. 7 is a partial side view of the embodiment of FIG. 5.

DETAILED DESCRIPTION

Figure 1:
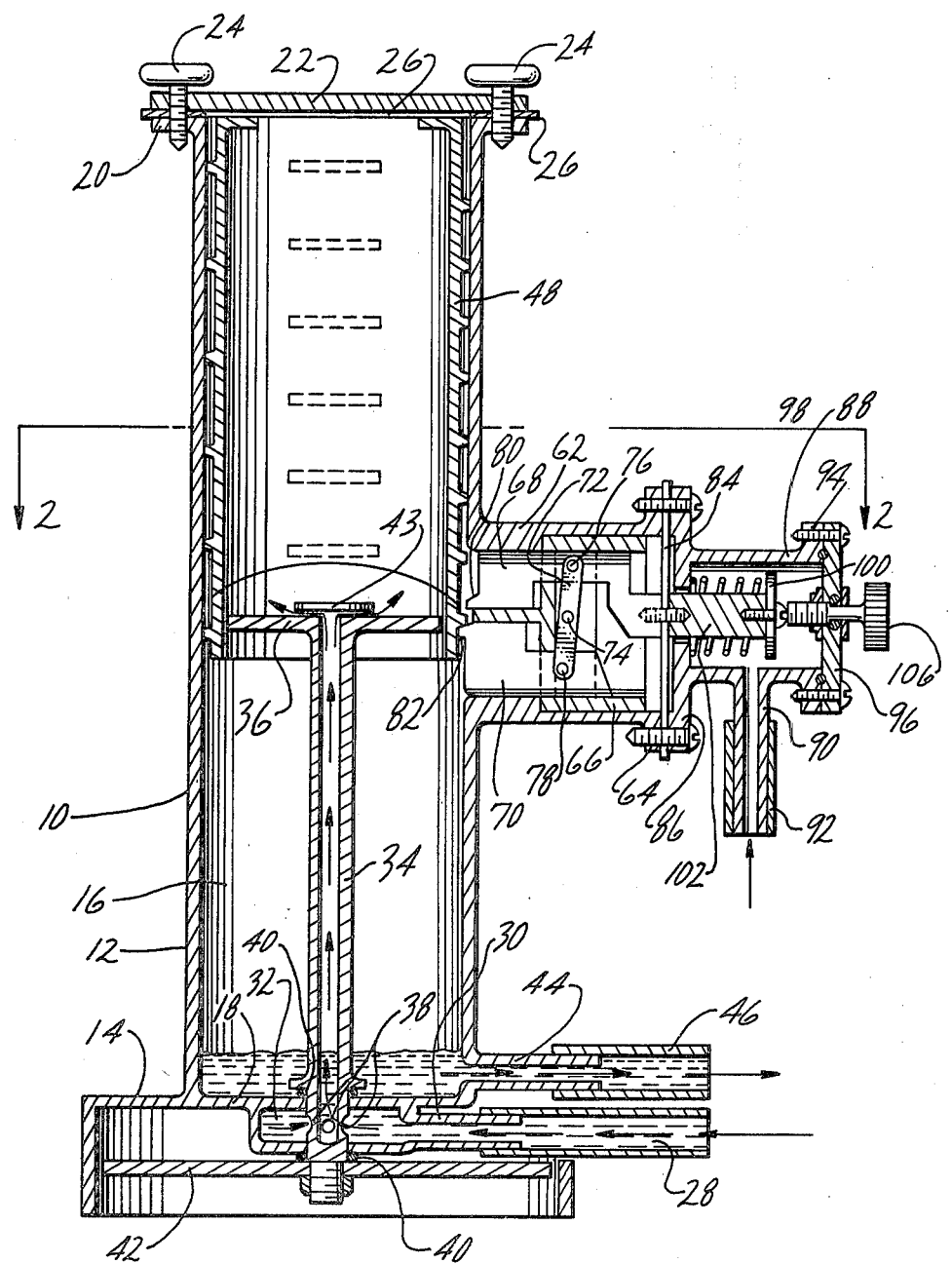
FIG. 1 is an elevational view partly in section of a chlorinator according to the present invention.

Referring to the drawings in detail, the numeral 10 indicates generally the housing of the chlorinator which includes a vertical tubular member 12 extending upwardly from a base 14. The tubular member 12 forms the side wall of a cylindrical chamber 16 having a bottom wall 18. The bottom wall 18, base 14 and tubular member 12 may be molded from a single piece of plastic material. The upper end of the tubular member 12 terminates in a flange 20. A removable lid 22 is clamped to the top of the flange 20 by a pair of thumb screws 24. When the lid 22 is in place, a gasket 26 provides a gas-tight seal for sealing off the interior of the cylindrical chamber 16.

An inlet pipe 28 connected to the output side of a pool filter F in the circulating system directs water through a nipple 30 to an inlet cavity 32 in the base of the housing. A tubular inlet member 34 extends up inside the cylindrical chamber 16 and terminates at its upper end in a flange, forming a platform 36 positioned about halfway up the chamber 16. The lower end of the tubular inlet member 34 extends through a hole in the floor 18 and through a hole in the wall of the bottom of the inlet chamber 32. Holes 38 in the inlet member 34 allow water to pass upwardly from the inlet chamber 32 through the interior of the tubular inlet member 34 to the top of the platform 36. The tubular inlet member 34 is journaled for rotation in the holes in the floor 18 and wall of the inlet chamber 32. O-rings 40 prevent leakage of water out of the inlet chamber 32 except through the openings 38. A dial member 42 is secured to the lower end of the tubular inlet member 34. As shown in FIG. 2, the dial 42 can be manually rotated to select any one of four angular positions. This operates to set the rate at which the chlorine is dispensed, as will be hereinafter described in detail.

Water entering the inlet pipe 28 passes up through the center of the tubular input member 34 and directs water across the top surface of the platform 36. A baffle 43 partially closes off the end of the inlet member 34 and directs the water in a radial path as shown by the arrows in FIG. 1. After flowing across the top surface of the platform 36, the water falls back to the bottom of the chamber where it collects and is withdrawn off through an outlet nipple 44 and outlet tube 46 which connects to the low pressure or vacuum side of the pump P in the pool filter system.

A tubular sleeve member 48, open at both ends, is slidably positioned inside the chamber 16 with the lower end extending through the annular space formed between the wall of the chamber 16 and the outer perimeter of the platform 36. The inside of the sleeve is provided with a longitudinal ridge 50 which acts as a key engaging a notch or keyway 52 in the edge of the platform 36 so that the sleeve and platform rotate as a unit when the dial 42 is rotated. The outside of the sleeve is provided with four columns 54, 56, 58, and 60 of horizontally projecting ledges. Each column of ledges has a different uniform spacing between the ledges. These ledges are used as detents for controlling the vertical position of the sleeve within the chamber 16, as hereinafter described.

As shown in FIGS. 1 and 2, the housing 10 includes a branch pipe section 62 terminating in an outer flange 64. The section 62 opens into the chamber 16 adjacent the platform 36. Positioned inside the section 62 is a molded fixture 66 which acts as a guide for a pair of horizontal slide members 68 and 70. The slide members are joined by a pivot arm 72. The pivot arm is pivoted on its center on a shaft 74 supported by the fixture 66. Pivot arm 72 is pivotally attached to the upper slide 68 by a pin 76 and pivotally attached at its lower end to the lower slide 70 by a pin 78. The pivot arm 72 causes the slide members 68 and 70 to always move in opposite directions relative to each other.

The slide members 68 and 70 are formed at their inner ends with projections 80 and 82, respectively, which are spaced apart a distance slightly greater than the thickness of the ledges on the outer surface of the sleeve 48. As shown in FIG. 1, the projection 82 extends under the adjacent ledge of the sleeve, thereby supporting the sleeve in the position shown. By pushing the upper slide 68 inwardly, the lower slide 70 withdraws the projection 82, allowing the sleeve to drop to a position in which the next ledge engages the top of the projection 80. Thus when the slides are returned to the position shown in FIG. 1, the pivoting cycle results in the sleeve moving down sufficiently for the next ledge to be resting on the projection 82. Thus the two slides in effect operate as an escapement mechanism in which each back-and-forth cycle of the slides allows the sleeve to advance downwardly by the distance between adjacent ledges. By rotating the sleeve, different columns of ledges can be positioned to engage the projections 80 and 82 of the escapement mechanism. Each column of ledges, because of the difference in spacing, allows the sleeve to advance in larger or smaller increments with each cycle of the escapement mechanism.

The escapement mechanism is cycled in response to pressure changes which occur when the pump of the filter system is cycled on and off. To this end, the upper slide 68 is secured at its outer end to the center of a flexible diaphragm 84 which is clamped to the flange 64 by a flange 86 of an outer pipe section 88. The interior of the pipe 88 may be open to atmosphere, but is preferably connected through a nipple 90 and tubing 92 to the high pressure side of the pump in the pool filter system, thus providing a positive pressure against the diaphragm 84. The outer end of the pipe 88 terminates in a flange 94 to which is bolted or otherwise secured an end plate 96. A coil spring 98 extends between the flange 86 and a flange 100 on the end of a bracket 102 secured to the outside of the diaphragm 84. Thus the spring 98 normally urges the diaphragm and the upper slide member 68 in a direction away from the sleeve, thereby moving the lower slide 70 into the detent position.

When the pump is started, a positive pressure against the diaphragm 84 and a negative pressure or vacuum on the chamber side of the diaphragm 84 cause the escapement mechanism to index the sleeve to the next lower position. It will be seen that this cycle is repeated each time the pump is turned off and again turned on. A thumb screw 106 extending through the end wall 96 may be used to hold the diaphragm 84 in a fixed position to prevent cycling of the escapement mechanism. This may be used as a safety measure when working on the equipment to prevent an extra chlorine dosage from taking place.

In operation, the lid 22 is removed and the sleeve 48 is rotated to disengage a ledge from the escapement mechanism, thus allowing the sleeve to be freely lifted to its uppermost position. The sleeve is then rotated to bring the ledge in one of the four selected columns back into engagement with the projection 82. With the sleeve now positioned in its uppermost position, the sleeve and platform form a container which is filled with granular chlorine. The lid 22 is then replaced and clamped in position to seal the chamber 16. Initially, when water is introduced into the chamber through the inlet tube 28, the water flowing across the top of the platform 36 dissolves the granules in the immediate vicinity of the platform 36. As the moisture tends to percolate upward into the granules, it causes the granules to swell and form a bridge of caked or congealed granules in the region immediately above the platform 36. This bridge prevents the granules in the upper region of the sleeve from moving downwardly as the water dissolves the granules at the surface of the platform 36. Since the water is free-flowing across the surface of the platform 36, it does not penetrate upwardly as it dissolves the granules. As it dissolves the chlorine, the water forms a cavity below the bridge. Thus the amount of granules dissolved during each cycle is self-limiting. The chlorinating process may be complete within a short interval of time following the starting of the pump, with no further dissolving of the granules taking place until the pump is stopped and restarted again, allowing the escapement mechanism to lower the sleeve to the next ledge position.

Referring to the embodiment shown in FIGS. 5–7, the chlorinator includes a housing 110 which includes a vertical tubular section 112 supported on a base 114. The tubular section 112 forms the side wall of a cylindrical chamber 116 having a bottom wall 118. The upper end of the tubular member 112 terminates in a flange 120. A removable lid 122 is clamped to the top of the flange 120 by a pair of thumb screws 124. When the lid 122 is in place, a gasket 126 provides a gas-tight seal for sealing off the interior of the cylindrical chamber 116.

An inlet pipe 128 connected to the output side of a pool filter directs water into a vertical stand pipe 134 which extends upwardly into the cylindrical chamber 116. Water is discharged through the upper end of the stand pipe 134 into a concentric vertically adjustable telescoping tube 135 which terminates at its upper end in a flange or platform 136, the flange extending out to the margins of the cylindrical chamber and terminating at its outer perimeter in a circumferential lip 137. A baffle 143 is secured above the flange 136 by spacers 145.

The lower end of the telescoping tube 135 is sealed to the stand pipe 134 by a gasket seal 147 forming a sliding seal with the outer surface of the stand pipe 134. A spiral spring 149 provides a friction clutch which holds the tube 135 in any vertical position within the chamber 116 while still permitting the tube 135 to be moved vertically in a manner hereinafter described.

After passing up through the stand pipe 134 and out the top of the tube 135, the inlet water passes around the baffle 143 and flows up over the top of the circumferential lip 137 and drops back to the bottom of the chamber where it is drawn off through an outlet tube 146 connected to the vacuum side of the pump. The pump draws the water out of the housing at a rate which balances with the rate at which water enters the housing so the level of water inside the chamber remains near the bottom of the chamber. While the level may vary within the chamber, it cannot rise by any appreciable amount since the chamber is sealed and trapped air above the water surface cannot escape.

After the tubular member 135 is pressed down to its lowest most position, granulated chlorine compound is poured into the top of the cylindrical chamber 116 and the top 122 is then secured in place. As in the embodiment described in connection with FIGS. 1–4, as the water flows over the lip 137, the level of the water is maintained in contact with the bottom of the granular mass. The wetting action of the water on the granular chlorine dissolves the granules in the immediate vicinity of the pltform 136. As the moisture tends to percolate upward into the granules, it causes the granules to swell and fuse into a bridge of caked or congealed granules in the region immediately above the platform 136. This bridge prevents the dry granules in the upper region of the sleeve from moving downwardly as the water dissolves the granules at the bottom of the granular mass. This action limits the amount of chlorine that can be dissolved by the water. Since the dissolving action is self-limiting, it is necessary to move the level of water upwardly relative to the granular mass to dissolve additional chlorine into the water. This is accomplished by a ratchet and pawl mechanism that is cycled each time the pool pump is cycled off and on.

The ratchet and pawl mechanism for lifting the tubular member 135 includes a set of ratchet teeth 150 formed in the outer wall of the tubular member 135. A pawl 153 is moved into lifting engagement with one of the ratchet teeth by a pressure-actuated mechanism including a horizontally movable rod 155 that is joined at one end to the pawl by hinge pin 157. The pawl slides in a groove 159 in a guide member 161 which also slidably supports the rod 155. The other end of the rod is secured to a flexible diaphragm 184. The diaphragm 184 extends across the end of a branch pipe section 162 of the housing 110 and is enclosed by an end cap 196. The pipe section 162 and end cap 196 have abutting flanges which are screwed together and clamp the outer edge of the diaphragm, so that the diaphragm also acts as a seal for the housing. A return spring 198 engages a spring retainer or washer 200 on the end of a rod 202. The rod is secured to the diaphragm 184 on the opposite side from the rod 155. Thus the return spring 198 urges the diaphragm and consequently the pawl away from the ratchet teeth.

Water is admitted into the interior of the end cap 196 behind the diaphragm 184 through an inlet 190 which is connected to the high pressure side of the pool pump. Thus when the pump is started, the pressure of the water discharged from the pump acts on the diaphragm 184 to move the pawl 153 into engagement with one of the ratchet teeth. The pawl exerts a vertical component of force against the ratchet tooth, lifting the tube 135 by an amount controlled by the length of stroke of the rod 155 and associated diaphragm 184. The length of the stroke is controlled by a handle 220 on the outside of the housing end cap 196. The handle rotates a shaft 222 extending inside the housing end cap through an O-ring seal 224. The handle and shaft rotates a stop member 226 which operates to limit the distance the diaphragm 184 moves the washer 200 in compressing the spring 198. With the handle in position 3, as shown in the drawings, the stop member 226 does not engage the washer 200, and this allows the maximum deflection of the diaphragm and attendant movement of the pawl 153 in lifting the tube 135. If the handle is rotated to position 1, stop surface 230 is rotated into the path of the washer 200 thereby limiting the stroke produced by the diaphragm 184. Rotation of the handle into position 2 moves a stop surface 232 into position to engage the washer 200 thereby further limiting the stroke.

Because the pawl 153 produces a considerable lateral force on the tube 135, it is desirable to provide a guide wheel 240 journaled on a lug 242 secured to the tube 135 on the opposite side from the ratchet. The guide wheel 240 engages the inner surface of the tubing member 112 of the housing 110 to transfer the lateral force of the pawl to the housing wall. Depending on the length of the stroke of the rod 155 produced by the diaphragm 184 as limited by the stop member 226, the level of the water at the top of the circumferential lip 137 is raised by some predetermined incremental amount each time the pump is turned on. Thus the arrangement of FIGS. 5–7 functions to dissolve an additional amount of granulated chlorine compound from the bottom of the mass or charge of chlorine in the top of the cylindrical chamber each time the pool pump is cycled off and on.

By virtue of the bridging action discussed above, the granular material remains in the top of the chamber with chlorine being dissolved into the water from the under surface of the bridging portion of the granular material. To achieve an effective bridging action, the diameter of the surrounding cylindrical wall should be of the order of .4" or less. A standard 3" PVC pipe, having a 3¼" I.D. has been found to be satisfactory. It has also been found that a granular chlorine compound of sodium dichloro-s-triazine, commonly referred to as dichloro, gives the best results, although calcium hypochlorite (HTH) granules may be used.

What is claimed is:

1. Apparatus for dissolving highly soluble chlorine compound granules into a pool or the like in which a pump periodically operates to circulate water from the pool through a filter and back to the pool, the apparatus comprising:

a housing, means defining the side walls of a vertical chamber within the housing for receiving the chlorine compound granules, means providing a bottom surface in the chamber for initially supporting the chlorine compound granules when they are poured into the chamber, means directing a flow of water over said bottom surface in the chamber for wetting and dissolving the lowermost granules in the chamber adjacent the bottom surface, the wetted granules immediately above the surface of the water expanding against the sides of the chamber and forming a bridge supporting the still dry granules in the upper portion of the chamber, and means for adjusting the vertical level of the bottom surface upwardly relative to the side walls of the chamber to raise the level of the water flowing across said surface in relation to said vertical chamber to bring the water into contact with the under surface of said bridge formed by the undissolved chlorine granules within the chamber, said means for adjusting the vertical level of the bottom surface in relation to said vertical chamber including means responsive to cycling the pump off and on for adjusting the position of the bottom surface relative to the vertical chamber by a predetermined incremental amount with each off-on cycle of the pump.

2. Apparatus of claim 1 wherein the means defining the vertical chamber includes a vertically movable tubular sleeve forming the side walls of the chamber, and said means for periodically adjusting the level of the water in relation to said vertical chamber comprises means for lowering the sleeve in incremental steps.

3. Apparatus of claim 2 wherein the adjusting means includes means responsive to cycling the pump off and on for adjusting the sleeve downwardly by a predetermined incremental amount with each off-on cycle of the pump.

4. Apparatus of claim 1 wherein said means for adjusting the vertical level of the water flowing across said bottom surface relative to said vertical chamber includes means for raising said bottom surface inside the vertical chamber.

5. Apparatus of claim 4 wherein said means raising the bottom surface comprises a pair of telescoping tubes, one of the tubes being supported vertically inside the housing, the other tube being concentric with and movable vertically along said one tube and terminating at its upper end in platform defining said bottom surface, and means directing water from the pump into said one tube, the water flowing up through the telescoping tubes outwardly across the top of the platform, and flowing back out the bottom of the housing.

6. Apparatus of claim 5 further including ratchet means for lifting said other tube and associated platform in incremental steps.

7. A granular chlorine dispenser for chlorinating water from a swimming pool or the like, comprising:

a housing including a vertically extending tubular member forming a chamber closed at both ends, a stand pipe extending up into the chamber less than half the length of the tubular member, a tube having a flange at one end telescoping over the stand pipe and forming an adjustable extension of the stand pipe, the flange extending outwardly substantially to the periphery of the chamber and dividing the chamber into an upper and lower region, means directing water up the stand pipe and tube, the water flowing across the top surface of the flange, over the outer edge of the flange, and back down into the lower region of the chamber, outlet means for withdrawing water from the lower region of the chamber, and means for raising the tube in the chamber in incremental steps.

8. Apparatus of claim 7 further including means for opening the upper end of the tubular member to add granular chlorine to said upper region of the chamber.

9. Apparatus of claim 8 wherein said means for raising the tube in the chamber includes means actuated by a change in fluid pressure for stepping the tube.

10. Apparatus of claim 9 wherein said means for raising the tube comprises a set of ratchet teeth along the length of the tube, a diaphragm, a pawl actuated by the diaphragm in response to a change in pressure across the diaphragm, the pawl moving into engagement with a ratchet tooth to move the tube, and means for changing the fluid pressure on one side of the diaphragm to move the diaphragm and associated pawl into ratchet engaging position to lift the tube.

11. A granulated chlorine dispenser for operation in a pump-operated water circulation system, comprising:

a housing forming a sealed chamber, a sleeve member movable vertically within the chamber, platform means supported by the housing inside the sleeve, the platform and sleeve forming a container receiving the granulated chlorine, means connected to the high pressure side of pump-operated circulating system for directing a flow of water across the top of the platform means, the water draining from the platform to the bottom of the chamber, means connecting the chamber to the low pressure side of the pump-operated circulating system for removing water from the chamber, and drive means for adjusting the position of the sleeve downwardly relative to the platform.

12. Apparatus of claim 11 wherein said drive means includes means for adjusting the sleeve downwardly whenever the circulation system is cycled off and on.

13. Apparatus of claim 12 wherein said drive means adjusts the sleeve downwardly a predetermined distance each time the circulation system is cycled off and on.

14. Apparatus of claim 13 further including means for selectively presetting the distance the sleeve is adjusted.

15. Apparatus of claim 12 wherein said drive means includes means responsive to changes in pressure when the pump-operated circulating system is operating and turned off for advancing the sleeve by an incremental amount.

16. Apparatus of claim 15 wherein the drive means includes an escapement means engaging step means on the outside of the sleeve.

17. A chlorinator for swimming pools or the like in which a pump circulates water from the pool through a filter system back to the pool, the chlorinator comprising:

a housing having a vertical cylindrical chamber, a tubular sleeve positioned in the chamber and coaxial therewith, the chamber being longer than the sleeve to permit vertical movement of the sleeve in the chamber, an inlet pipe extending into the chamber, the pipe extending upwardly inside the sleeve, a platform member supported inside the sleeve, the platform member forming an annular space between the platform and the housing through which the sleeve moves, the inlet pipe directing water onto the top surface of the platform, the top of the platform and surrounding sleeve forming the bottom and side walls respectively of a container for receiving granulated chlorine, and means for lowering the sleeve to control the rate at which the granulated chlorine is dissolved by the water flowing over the surface of the platform.

18. Apparatus of claim 17 wherein said means for lowering the sleeve includes means responsive to changes in water pressure produced by turning the pump on and off for lowering the sleeve in incremental steps.

19. Apparatus of claim 17 further including means for adjusting the distance the sleeve moves with each incremental step.

20. Apparatus of claim 17 wherein the chamber is gas-tight.

21. Apparatus of claim 20 further including an outlet pipe for draining water from the chamber, the inlet pipe being connected to the high pressure side of the pump and the outlet side being connected to the low pressure side of the pump.

22. Apparatus of claim 21 wherein said means for lowering the sleeve includes a flexible diaphragm, one side of the diaphragm being open to the gas-tight chamber, and escapement means engaging vertically spaced stops on the sleeve for stepping the sleeve, the diaphragm activating the escapement means in response to deflection of the diaphragm by a pressure change on either side of the diaphragm.

23. Apparatus of claim 22 wherein the sleeve includes a plurality of columns of said vertically spaced stops on the sleeve, means for rotating the sleeve to align any one of the columns of stops with the escapement means, the spacing of the stops being different in each column, whereby the size of the incremental steps of the sleeve are selected by rotating the sleeve and columns of stops relative to the escapement means.

24. Apparatus of claim 22 wherein the outer side of the diaphragm is in fluid communication with the high pressure side of the pump.

* * * * *